United States Patent
Zhao et al.

(10) Patent No.: US 9,483,428 B2
(45) Date of Patent: Nov. 1, 2016

(54) STORAGE APPARATUS, AND SYSTEM AND METHOD FOR EXECUTING ACCESS OPERATIONS

(71) Applicant: Huawei Technologies Co., Ltd., Shenzhen, Guangdong (CN)

(72) Inventors: Changhong Zhao, Shanghai (CN); Qingxue Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 14/330,938

(22) Filed: Jul. 14, 2014

(65) Prior Publication Data

US 2015/0032926 A1    Jan. 29, 2015

(30) Foreign Application Priority Data

Jul. 25, 2013  (CN) .......................... 2013 1 0314520

(51) Int. Cl.
*G06F 13/00*    (2006.01)
*G06F 13/364*   (2006.01)
*G06F 13/16*    (2006.01)

(52) U.S. Cl.
CPC ......... *G06F 13/364* (2013.01); *G06F 13/1647* (2013.01); *G06F 13/1684* (2013.01)

(58) Field of Classification Search
CPC .................... G06F 13/1647; G06F 13/1684
See application file for complete search history.

(56) References Cited

U.S. PATENT DOCUMENTS

| | | | |
|---|---|---|---|
| 5,113,506 A | 5/1992 | Moussouris et al. | |
| 5,590,299 A | 12/1996 | Bennett | |
| 6,381,669 B1 | 4/2002 | Chudnovsky et al. | |
| 7,197,575 B2 * | 3/2007 | Huppenthal | G06F 13/1684 370/463 |
| 7,336,700 B2 * | 2/2008 | Andre | G06F 13/385 375/219 |
| 2008/0294855 A1 | 11/2008 | Chen et al. | |
| 2010/0005221 A1 | 1/2010 | Nieminen | |
| 2010/0228923 A1 | 9/2010 | Lim | |

FOREIGN PATENT DOCUMENTS

| | | |
|---|---|---|
| CN | 1437728 A | 8/2003 |
| CN | 102084346 A | 6/2011 |

* cited by examiner

*Primary Examiner* — Zachary K Huson

(57) ABSTRACT

Embodiments of the present invention provide a storage apparatus, and a system and a method for executing access operations. The apparatus includes an interleaved bus, N memory groups, and K direct-connect bus groups, where K is less than or equal to N; the interleaved bus includes M master interfaces and S slave interfaces, where M is less than or equal to S, and each master interface among the M master interfaces is configured to receive continuous-addresses access operations; each memory group among the N memory groups includes S memories respectively connected to the S slave interfaces, where the interleaved bus is configured to decode and send the continuous-addresses access operations to at least one memory group among the N memory groups in an interleaved manner; and a first direct-connect bus group among the K direct-connect bus groups receives and sends the discrete-addresses access operations to at least one memory group.

13 Claims, 6 Drawing Sheets

300

An interleaved bus receives continuous-addresses access operations through any one master interface among M master interfaces, decodes the continuous-addresses access operations, and sends the continuous-addresses access operations to at least one memory group among N memory groups through S slave interfaces, where each memory group among the N memory groups includes S memories respectively connected to the S slave interfaces, addresses of the S memories in each memory group among the N memory groups are continuous, a difference between addresses of two storage units of any one memory among the S memories in each of the memory groups is an integral multiple of S, M is less than or equal to S, and M, S, and N are all integers — S310

A first direct-connect bus group receives discrete-addresses access operations, and sends the discrete-addresses access operations to at least one memory group among the N memory groups, where the first direct-connect bus group is any one direct-connect bus group among K direct-connect bus groups, each direct-connect bus group among the K direct-connect bus groups is connected to at least one memory group among the N memory groups, K is less than or equal to N, and K is an integer — S320

300

| An interleaved bus receives continuous-addresses access operations through any one master interface among M master interfaces, decodes the continuous-addresses access operations, and sends the continuous-addresses access operations to at least one memory group among N memory groups through S slave interfaces, where each memory group among the N memory groups includes S memories respectively connected to the S slave interfaces, addresses of the S memories in each memory group among the N memory groups are continuous, a difference between addresses of two storage units of any one memory among the S memories in each of the memory groups is an integral multiple of S, M is less than or equal to S, and M, S, and N are all integers | ╱ S310 |

↓

| A first direct-connect bus group receives discrete-addresses access operations, and sends the discrete-addresses access operations to at least one memory group among the N memory groups, where the first direct-connect bus group is any one direct-connect bus group among K direct-connect bus groups, each direct-connect bus group among the K direct-connect bus groups is connected to at least one memory group among the N memory groups, K is less than or equal to N, and K is an integer | ╱ S320 |

FIG. 6

STORAGE APPARATUS, AND SYSTEM AND METHOD FOR EXECUTING ACCESS OPERATIONS

CROSS-REFERENCE TO RELATED APPLICATION

This application claims priority to Chinese Patent Application No. 201310314520.5, filed on Jul. 25, 2013, which is hereby incorporated by reference in its entirety.

TECHNICAL FIELD

The present invention relates to the field of electronic technologies, and in particular, to a storage apparatus, and a system and a method for executing access operations.

BACKGROUND

Bus design can be classified into interleaved bus design and non-interleaved bus design based on address decoding. An overwhelming majority of existing bus design is based on the non-interleaved bus design. The interleaved bus design is being increasingly adopted to enable software to use a storage resource more flexibly. An interleaved bus can implement a pipelined operation for block data access operations sent by each master device, and can make full use of bandwidths of a whole system. However, if a master device sends discrete single operations, the pipelined operation cannot be implemented normally, bandwidth utilization efficiency of the interleaved bus is reduced significantly, and in a worst case, efficiency drops to 1/M (M is the number of master interfaces of the bus) of original efficiency.

SUMMARY

Embodiments of the present invention provide a storage apparatus, and a system and a method for executing access operations, which can ensure efficiency of the access operations.

In a first aspect, a storage apparatus is provided, including an interleaved bus, N memory groups, and K direct-connect bus groups, where K is less than or equal to N, and N and K are both integers; the interleaved bus includes M master interfaces and S slave interfaces, where each master interface among the M master interfaces is configured to receive continuous-addresses access operations, M is less than or equal to S, and M and S are both integers; each memory group among the N memory groups includes S memories respectively connected to the S slave interfaces, where addresses of the S memories in each of the memory groups are continuous, a difference between addresses of two storage units of any one memory among the S memories in each of the memory groups is an integral multiple of S, and the interleaved bus is configured to decode the continuous-addresses access operations, and send the continuous-addresses access operations to at least one memory group among the N memory groups; and each direct-connect bus group among the K direct-connect bus groups is connected to at least one memory group among the N memory groups, where one end of each direct-connect bus in each of the direct-connect bus groups is used to receive discrete-addresses access operations, the other end of each direct-connect bus is connected to a respective corresponding memory in the at least one memory group, memory groups connected to different direct-connect bus groups are different, and each direct-connect bus group among the K direct-connect bus groups is configured to send the discrete-addresses access operations to at least one memory group among the N memory groups.

With reference to the first aspect, in a first possible implementation manner of the first aspect, among the N memory groups, there are L memory groups connected to the direct-connect bus group, where L is less than or equal to N, and is greater than or equal to K; and the L memory groups include at least one of the following types of memories: single-port memory, symmetric dual-port memory, and asymmetric dual-port memory, where one port of an asymmetric dual-port memory or symmetric dual-port memory is configured to connect to the interleaved bus, the other port of the asymmetric dual-port memory or symmetric dual-port memory is configured to connect to a direct-connect bus in the K direct-connect bus groups; the single-port memory is configured to connect to an arbiter that is connected to the interleaved bus and a direct-connect bus in the K direct-connect bus groups.

With reference to the first possible implementation manner of the first aspect, in a second possible implementation manner of the first aspect, memories included in T memory groups among the L memory groups are symmetric dual-port memories or asymmetric dual-port memories, where T is an integer less than or equal to L, and L is equal to K; and any one memory in each memory group among the T memory groups is connected to a slave interface among the S slave interfaces through one port of the two ports, and is connected to a direct-connect bus in a direct-connect bus group among the K direct-connect bus groups through the other port of the two ports.

With reference to the first possible implementation manner of the first aspect, in a third possible implementation manner of the first aspect, memories included in P memory groups among the L memory groups are single-port memories, and the storage apparatus further includes P groups of arbiters, where P is an integer less than or equal to L, and L is equal to K; the P memory groups are connected, through the P groups of arbiters, to P direct-connect bus groups among the K direct-connect bus groups and to the S slave interfaces, where a single-port memory in a memory group among the P memory groups is connected, through an arbiter in a group of arbiters among the P groups of arbiters, to a direct-connect bus in a direct-connect bus group among the P direct-connect bus groups and to a slave interface among the S slave interfaces.

With reference to the third possible implementation manner of the first aspect, in a fourth possible implementation manner of the first aspect, an arbiter in the P groups of arbiters is configured to perform, according to weight values of the connected interleaved bus and direct-connect bus, or according to priorities of the interleaved bus and the direct-connect bus, or based on a fair polling scheme, arbitration for an access operation that is among the continuous-addresses access operations and is sent by the interleaved bus to a memory connected to the arbiter, and for an access operation that is among the discrete-addresses access operations and is sent by the direct-connect bus to a memory connected to the arbiter.

With reference to the first aspect, or any one of the first to the fourth possible implementation manners of the first aspect, in a fifth possible implementation manner of the first aspect, each master interface among the M master interfaces is coupled to a first master device, where the first master device is configured to generate the continuous-addresses access operations; and one end of each direct-connect bus in each of the direct-connect bus groups is coupled to a second master device, where the second master device is configured to generate the discrete-addresses access operations.

In a second aspect, a system for executing access operations is provided, including a storage apparatus, a first master device, and a second master device; where the storage apparatus includes an interleaved bus, N memory groups, and K direct-connect bus groups, where K is less than or equal to N, and N and K are both integers; the interleaved bus includes M master interfaces and S slave interfaces, where each master interface among the M master interfaces is coupled to the first master device, M is less than or equal to S, and M and S are both integers; each memory group among the N memory groups includes S memories respectively connected to the S slave interfaces, where addresses of the S memories in each of the memory groups are continuous, and a difference between addresses of two storage units of any one memory among the S memories in each of the memory groups is an integral multiple of S; and each direct-connect bus group among the K direct-connect bus groups is connected to at least one memory group among the N memory groups, where one end of each direct-connect bus in each of the direct-connect bus groups is coupled to the second master device, the other end of each direct-connect bus is connected to a respective corresponding memory in the at least one memory group, and memory groups connected to different direct-connect bus groups are different;

the first master device is configured to send continuous-addresses access operations to the interleaved bus through anyone master interface among the M master interfaces of the interleaved bus, where the interleaved bus is configured to decode the continuous-addresses access operations, and send the continuous-addresses access operations to at least one memory group among the N memory groups; and the second master device is configured to send discrete-addresses access operations to any one direct-connect bus group among the K direct-connect bus groups, where the any one direct-connect bus group is configured to send the discrete-addresses access operations to at least one memory group among the N memory groups.

With reference to the second aspect, in a second possible implementation manner of the second aspect, among the N memory groups, there are L memory groups connected to the direct-connect bus group, where L is less than or equal to N, and is greater than or equal to K; and the L memory groups include at least one of the following types of memories: single-port memory, symmetric dual-port memory, and asymmetric dual-port memory, where one port of an asymmetric dual-port memory or a symmetric dual-port memory is configured to connect to the interleaved bus, the other port of the asymmetric dual-port memory or symmetric dual-port memory is configured to connect to a direct-connect bus in the K direct-connect bus groups, and the single-port memory is configured to connect to an arbiter connected to the interleaved bus and a direct-connect bus in the K direct-connect bus groups.

In a third aspect, a method for executing access operations is provided, including: receiving, by an interleaved bus, continuous-addresses access operations through any one master interface among M master interfaces, decoding the continuous-addresses access operations, and sending the continuous-addresses access operations to at least one memory group among N memory groups through S slave interfaces, where each memory group among the N memory groups includes S memories respectively connected to the S slave interfaces, addresses of the S memories in each memory group among the N memory groups are continuous, a difference between addresses of two storage units of any one memory among the S memories in each of the memory groups is an integral multiple of S, M is less than or equal to S, and M, S, and N are all integers; and receiving, by a first direct-connect bus group, discrete-addresses access operations, and sending the discrete-addresses access operations to at least one memory group among the N memory groups, where the first direct-connect bus group is any one direct-connect bus group among the K direct-connect bus groups, each direct-connect bus group among the K direct-connect bus groups is connected to at least one memory group among the N memory groups, memory groups connected to different direct-connect bus groups are different, K is less than or equal to N, and K is an integer.

With reference to the third aspect, in a first possible implementation manner of the third aspect, the at least one memory group to which the first direct-connect bus group sends the discrete-addresses access operations and the at least one memory group to which the interleaved bus sends the continuous-addresses access operations both include a first memory group, and memories included in the first memory group are symmetric dual-port or asymmetric dual-port memories; the decoding the continuous-addresses access operations and sending the continuous-addresses access operations to at least one memory group among the N memory groups through S slave interfaces includes: decoding, by the interleaved bus, an access operation that is among the continuous-addresses access operations and corresponding to a first symmetric dual-port or asymmetric dual-port memory, and sending the access operation to the first symmetric dual-port or asymmetric dual-port memory through a first port of the first symmetric dual-port or asymmetric dual-port memory in the first memory group; and the sending the discrete-addresses access operations to at least one memory group corresponding to the first direct-connect bus group among the N memory groups includes: sending, by the first direct-connect bus group, an access operation that is among the discrete-addresses access operations and corresponding to the first symmetric dual-port or asymmetric dual-port memory to the first symmetric dual-port or asymmetric dual-port memory through a second port of the first symmetric dual-port or asymmetric dual-port memory.

With reference to the third aspect, in a second possible implementation manner of the third aspect, the at least one memory group to which the first direct-connect bus group sends the discrete-addresses access operations and the at least one memory group to which the interleaved bus sends the continuous-addresses access operations both include a first memory group, and memories included in the first memory group are single-port memories; and the method further includes: when the interleaved bus and the first direct-connect bus group both send an access operation to a first single-port memory in the first memory group simultaneously, performing, by an arbiter, arbitration for the access operations that are separately sent by the interleaved bus and the first direct-connect bus group to the first single-port memory, to acquire an arbitration result; and sending, by the arbiter according to the arbitration result, the access operation that is sent by the interleaved bus to the first single-port memory and the access operation that is sent by the first direct-connect bus group to the first single-port memory to the first single-port memory.

With reference to the second possible implementation manner of the third aspect, in a third possible implementation manner of the third aspect, the performing, by an arbiter, arbitration for the access operations that are separately sent by the interleaved bus and the first direct-connect bus group to the first single-port memory includes: performing, by the arbiter according to weight values of the interleaved bus and the direct-connect bus, or according to priorities of the interleaved bus and the direct-connect bus, or based on a fair polling scheme, arbitration for the access operations that are separately sent by the interleaved bus and the first direct-connect bus group to the first single-port memory.

With reference to the third aspect, or any one of the first to the third possible implementation manners of the third aspect, in a fourth possible implementation manner of the third aspect, the receiving, by an interleaved bus, continuous-addresses access operations through any one master interface among M master interfaces includes: receiving, by the interleaved bus through the any one master interface among the M master interfaces, the continuous-addresses access operations sent by a first master device; and the receiving, by a first direct-connect bus group, discrete-addresses access operations includes: receiving, by the first direct-connect bus group, the discrete-addresses access operations sent by a second master device.

Therefore, the storage apparatus in the embodiments of the present invention includes an interleaved bus connected to N memory groups, and K direct-connect bus groups, each of which is connected to at least one memory group among the N memory groups. By using the storage apparatus, continuous-addresses access operations can be performed for one or more memory groups among the N memory groups through the interleaved bus, and discrete-addresses access operations can be performed for at least one memory group among the N memory groups through any one direct-connect bus group among the K direct-connect bus groups. In this way, efficiency of the continuous-addresses access operations can be ensured by taking advantage of a high access bandwidth that the interleaved bus provides for the continuous-addresses access operations, and efficiency of the discrete-addresses access operations can be ensured by taking advantage of high access efficiency of a direct-connect bus, and impacts between the discrete-addresses access operations and the continuous-addresses access operations can be lowered as far as possible to provide as high bandwidth as possible for the system.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

FIG. 6 shows a schematic flowchart of a method for executing access operations according to an embodiment of the present invention.

DESCRIPTION OF EMBODIMENTS

The following clearly describes the technical solutions in the embodiments of the present invention with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

Figure 1:
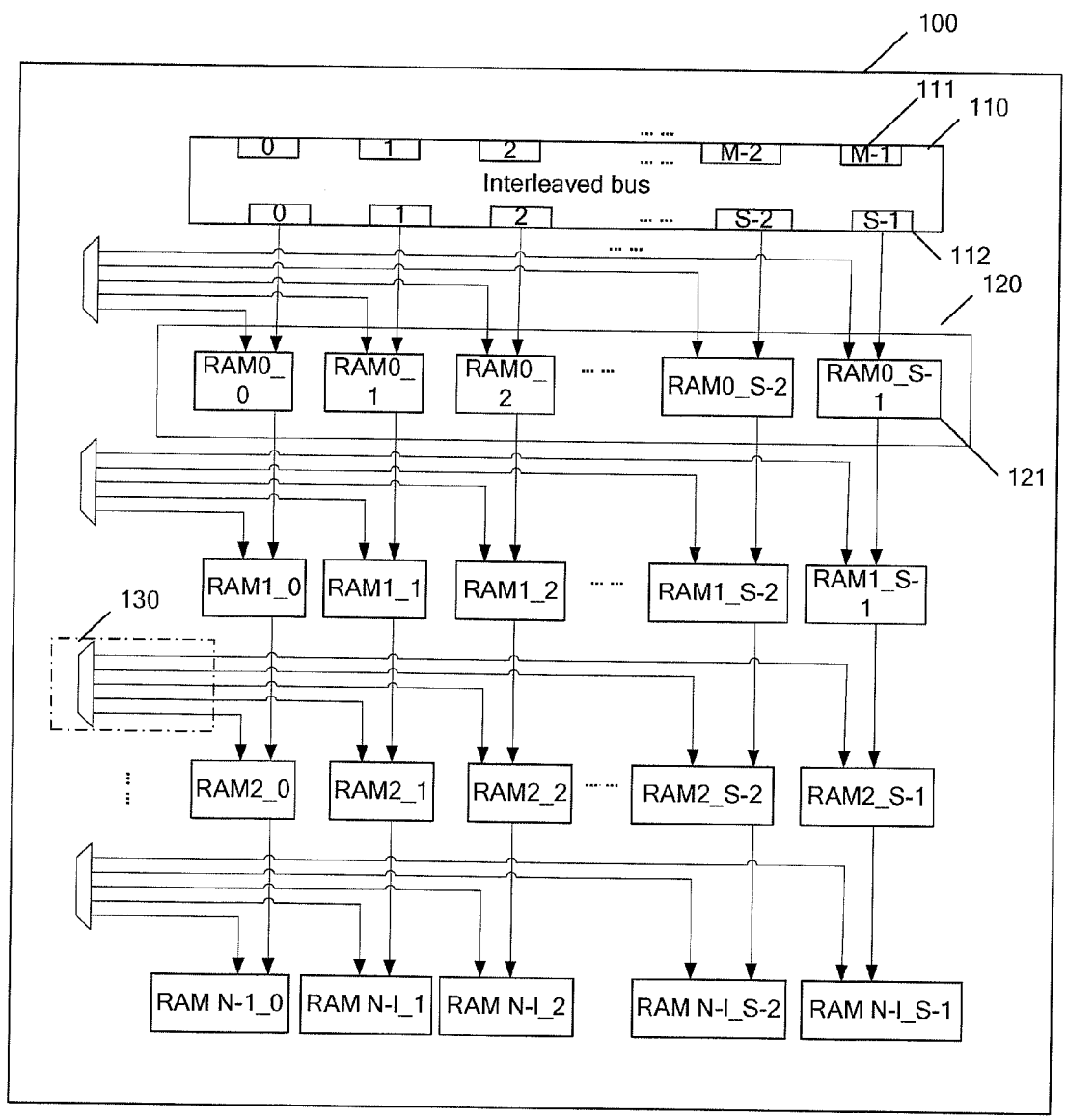
FIG. 1 shows a schematic diagram of a storage apparatus according to an embodiment of the present invention.

FIG. 1 is a schematic diagram of a storage apparatus 100 according to an embodiment of the present invention. As shown in FIG. 1, the storage apparatus 100 may include: an interleaved bus 110, N memory groups 120, and K direct-connect bus groups 130, where K is less than or equal to N, and N and K are both integers.

The interleaved bus 110 includes M master interfaces 111 and S slave interfaces 112. Each master interface 111 among the M master interfaces 111 receives continuous-addresses access operations, where M is less than or equal to S, and M and S are both integers.

Each memory group 120 among the N memory groups 120 includes S memories 121 connected to the S slave interfaces 112. Different memories 121 among the S memories are connected to different slave interfaces 112 among the S slave interfaces 112, where based on the sequence of the slave interfaces connected to the S memories 121, addresses of the S memories 121 in each memory group 120 among the N memory groups 120 are continuous, and a difference between addresses of two storage units of any one memory among the S memories 121 in each memory group 120 among the N memory groups 120 is an integral multiple of S. The interleaved bus 110 is configured to decode the continuous-addresses access operations, and send the continuous-addresses access operations to at least one memory group 120 among the N memory groups 120.

Each direct-connect bus group 130 among the K direct-connect bus groups 130 is connected to at least one memory group among the N memory groups. One end of each direct-connect bus in each direct-connect bus group is used to receive discrete-addresses access operations, and the other end is used to connect to a respective corresponding memory 121 in the at least one memory group 120. Each direct-connect bus group among the K direct-connect bus groups is configured to send the discrete-addresses access operations to at least one memory group among the N memory groups.

In this embodiment of the present invention, each direct-connect bus group may be connected to at least one memory group, and memory groups connected to different direct-connect bus groups are different. A direct-connect bus in each direct-connect bus group may be connected to only one memory.

Therefore, the storage apparatus in this embodiment of the present invention includes an interleaved bus connected to N memory groups, and K direct-connect bus groups, each of which is connected to at least one memory group among the N memory groups. By using the storage apparatus, continuous-addresses access operations can be executed for one or more memory groups among the N memory groups through the interleaved bus, and discrete-addresses access operations can be executed for at least one memory group among the N memory groups through any one direct-connect bus group among the K direct-connect bus groups. In this way, efficiency of the continuous-addresses access operations can be ensured by taking advantage of a high access bandwidth that the interleaved bus provides for the continuous-addresses access operations, efficiency of the discrete-addresses access operations can be ensured by taking advantage of high access efficiency of a direct-connect bus, and impacts between the discrete-addresses access operations and the continuous-addresses access operations can be lowered as far as possible to provide as high bandwidth as possible for the system.

In this embodiment of the present invention, each master interface among the M master interfaces of the interleaved bus may be coupled to a first master device, where the first master device is configured to generate continuous-addresses access operations; and one end of each direct-connect bus in each direct-connect bus group may be coupled to a second master device, where the second master device is configured to generate discrete-addresses access operations.

In this embodiment of the present invention, when a certain direct-connect bus group is connected to multiple memory groups, discrete-addresses access operations sent by a master device through the direct-connect bus group may involve only one memory group among the multiple memory groups, and may also involve at least two memory groups among the multiple memory groups. When the discrete-addresses access operations received by the direct-connect bus group need to involve two or more than two memory groups, the direct-connect bus group may have a decoding function, and decode the discrete-addresses access operations and send the discrete-addresses access operations to the two or more than two memory groups.

It should be understood that, in this embodiment of the present invention, a same master device may be connected to both a direct-connect bus group and an interleaved bus, but through different interfaces. When discrete-addresses access operations need to be executed, the same master device may send the discrete-addresses access operations to the direct-connect bus group; and when continuous-addresses access operations need to be executed, the same device may send the continuous-addresses access operations to the interleaved bus.

In this embodiment of the present invention, the number of master interfaces of the interleaved bus is usually less than the number of slave interfaces, that is, M is less than S. In order to implement bus decoding, a value of S may be an integer power of 2.

In this embodiment of the present invention, addresses of the S memories in each memory group among the N memory groups are continuous, and that a difference between addresses of two storage units of any one memory among the S memories in each memory group among the N memory groups is an integral multiple of S means that, addresses of the memories in each memory group among the N memory groups are interleaved, and that the interleaved bus can sequentially decode the continuous-addresses access operations according to the interleaved addresses and send the access operations to memories in one or more memory groups.

In this embodiment of the present invention, an address of a storage unit in a memory may also be referred to as a serial number of the storage unit. Addresses of the storage units in a storage array are different from each other, which may start from 0 and be sequentially numbered as 0, 1, 2, 3, and so on.

For example, as shown in Table 1, Table 1 shows interleaved addresses of four memory groups, where each memory group among the four memory groups includes four memories, and each memory may include 128 storage units. The interleaved bus sequentially decodes and sends access operations among the continuous-addresses access operations to corresponding memories according to the sequence of the addresses shown in the table. For example, when the first master device sends 16 operations on addresses that start from 0 and are continuous based on a bus bit width, the interleaved bus may sequentially decode and send the 16 bus operations to ram0_0 (address 0), ram0_1 (address 1), ram0_2 (address 2), ram0_3 (address 3), ram0_4 (address 4), ram0_5 (address 5), ram0_6 (address 6), ram0_7 (address 7), ram0_0 (address 8), ram0_1 (address 9), ram0_2 (address 10), ram0_3 (address 11), ram0_4 (address 12), ram0_5 (address 13), ram0_6 (address 14), and ram0_7 (address 15). When receiving continuous-addresses access operations that are separately sent by multiple master devices, the interleaved bus 110 may perform arbitration for the access operations sent by the multiple master devices, and according to an arbitration result, decode and send the access operations sent by the multiple master devices to corresponding memories, so that pipelined access operations can be implemented.

TABLE 1

| ram0_0 addr | ram0_1 addr | ram0_2 addr | ram0_3 addr | ram0_4 addr | ram0_5 addr | ram0_6 addr | ram0_7 addr |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| ... | ... | ... | ... | ... | ... | ... | ... |
| 1016 | 1017 | 1018 | 1019 | 1020 | 1021 | 1022 | 1023 |
| ram1_0 addr | ram1_1 addr | ram1_2 addr | ram1_3 addr | ram1_4 addr | ram1_5 addr | ram1_6 addr | ram1_7 addr |
| 1024 | 1025 | 1026 | 1027 | 1028 | 1029 | 1030 | 1031 |
| 1032 | 1033 | 1034 | 1035 | 1036 | 1037 | 1038 | 1039 |
| ... | ... | ... | ... | ... | ... | ... | ... |
| 2040 | 2041 | 2042 | 2043 | 2044 | 2045 | 2046 | 2047 |
| ram2_0 addr | ram2_1 addr | ram2_2 addr | ram2_3 addr | ram2_4 addr | ram2_5 addr | ram2_6 addr | ram2_7 addr |

TABLE 1-continued

| | | | | | | | |
|---|---|---|---|---|---|---|---|
| 2048 | 2049 | 2050 | 2051 | 2052 | 2053 | 2054 | 2055 |
| 2056 | 2057 | 2058 | 2059 | 2060 | 2061 | 2062 | 2063 |
| ... | ... | ... | ... | ... | ... | ... | ... |
| 3064 | 3065 | 3066 | 3067 | 3068 | 3069 | 3070 | 3071 |
| ram3_0 addr | ram3_1 addr | ram3_2 addr | ram3_3 addr | ram3_4 addr | ram3_5 addr | ram3_6 addr | ram3_7 addr |
| 3072 | 3073 | 3074 | 3075 | 3076 | 3077 | 3078 | 3079 |
| 3080 | 3081 | 3082 | 3083 | 3084 | 3085 | 3086 | 3087 |
| ... | ... | ... | ... | ... | ... | ... | ... |
| 4088 | 4089 | 4090 | 4091 | 4092 | 4093 | 4094 | 4095 |

It should be understood that, although the foregoing embodiment is described based on an example that the interleaved bus includes S slave interfaces and the S slave interfaces are respectively connected to S memories in a memory group, where the S memories are interleaved, the interleaved bus in this embodiment of the present invention may further include multiple other slave interfaces, and addresses of memories connected to the multiple other slave interfaces are interleaved. However, it should be understood that, the number of all master interfaces included by the interleaved bus is less than or equal to the number of all included slave interfaces, and the number of all included slave interfaces may be an integer power of 2.

The first master device and the second master device in this embodiment of the present invention may be a central processing unit (Center Processing Unit, CPU), a direct memory access (Direct Memory Access, DMA) controller, or the like. It should be understood that, in this embodiment of the present invention, the first master device may also send discrete-addresses access operations through the interleaved bus. The second master device may also send continuous-addresses access operations through the direct-connect bus. When the second master device sends continuous-addresses access operations for a certain memory group, access addresses corresponding to the continuous-addresses access operations are also interleaved. In this embodiment of the present invention, addresses of storage units in a memory are applicable to both the first master device and the second master device.

In this embodiment of the present invention, among the N memory groups of the storage apparatus, there are L memory groups connected to the direct-connect bus group, where L is less than or equal to N, and is greater than or equal to K; and memories in the L memory groups may be all single-port memories, or may be all symmetric dual-port or asymmetric dual-port memories, or may be partially single-port memories and partially symmetric dual-port or asymmetric dual-port memories.

In this embodiment of the present invention, a single-port memory means that the memory has only one port (a read-write port). At a given point of time, a single-port memory can only be read or written, that is, at a given point of time, a single-port memory cannot be read and written simultaneously. A symmetric dual-port memory has two ports (two read-write ports), where each port can be read or written simultaneously, that is, a symmetric dual-port memory can be accessed through two ports simultaneously at a given point of time. An asymmetric dual-port memory also has two ports, where one of the ports is a read port, and the other port is a write port. At a given point of time, the memory can be read through the read port of the two ports, and be written through the write port of the two ports. In this embodiment of the present invention, for the asymmetric dual-port memory, whether the read port is connected to a direct-connect bus and the write port is connected to the interleaved bus, or the read port is connected to the interleaved bus and the write port is connected to a direct-connect bus can be determined according to an actual need, and is not limited in this embodiment of the present invention.

The memory in this embodiment of the present invention may be a random access memory (Random Access Memory, RAM), and apparently, may also be a memory of another type. Though the memories in the accompanying drawings are RAMs, the present invention is not limited thereto. In this embodiment of the present invention, one port of a symmetric dual-port or an asymmetric dual-port memory is configured to connect to the interleaved bus, and the other port is configured to connect to a direct-connect bus; and the single-port memory is configured to connect to an arbiter connected to the interleaved bus and a direct-connect bus.

In this embodiment of the present invention, memories included in T memory groups 120 among the foregoing L memory groups 120 are symmetric dual-port memories or asymmetric dual-port memories. Any one memory in each memory group 120 among the T memory groups 120 is connected to an interface among the S slave interfaces 112 through one port of the two ports, and is connected to a direct-connect bus in a direct-connect bus group 130 among the K direct-connect bus groups 130 through the other port of the two ports, where T is an integer less than or equal to L, and L is equal to K. In other words, a direct-connect bus group is connected to only one memory group.

Figure 2:
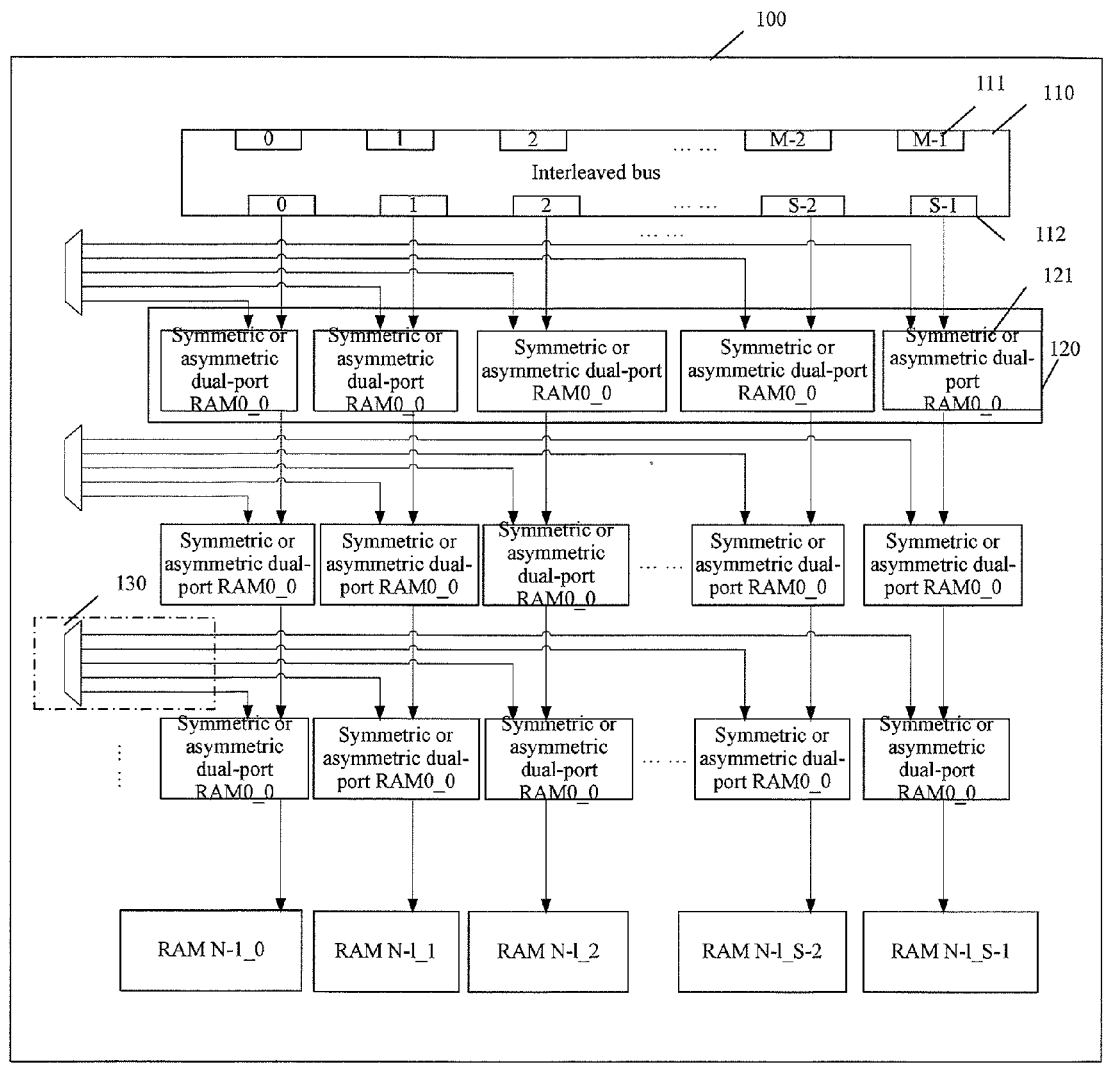
FIG. 2 shows a schematic diagram of a storage apparatus according to another embodiment of the present invention.

For example, as shown in FIG. 2, FIG. 2 shows three direct-connect bus groups. Compared with FIG. 1, in an embodiment corresponding to FIG. 2, memories connected to the three direct-connect bus groups are all symmetric dual-port RAMs or asymmetric dual-port RAMs specifically, where one port of a symmetric dual-port RAM or asymmetric dual-port RAM may be connected to a direct-connect bus, and the other port may be connected to a slave interface of the interleaved bus. The memories connected to the three direct-connect bus groups may be all symmetric dual-port RAMs, may be all asymmetric dual-port RAMs, and may also be partially symmetric dual-port RAMs and partially asymmetric dual-port RAMs.

Figure 3:
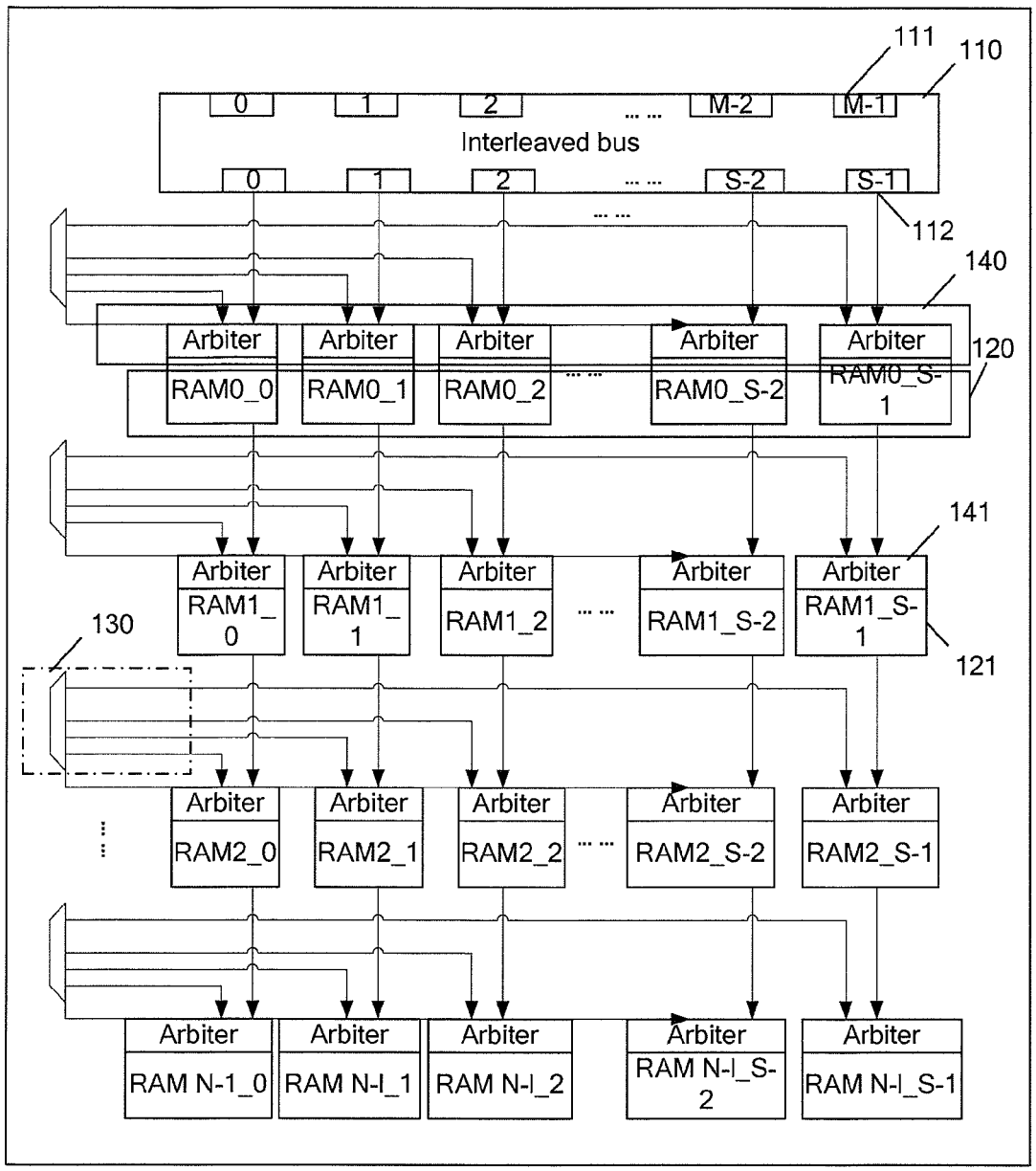
FIG. 3 shows a schematic diagram of a storage apparatus according to another embodiment of the present invention.

In an embodiment of the present invention, as shown in FIG. 3, different from FIG. 2, memories included in P memory groups 120 among the L memory groups 120 in FIG. 3 are single-port memories, and the storage apparatus further includes P groups of arbiters 140, where P is an integer less than or equal to L, and L is equal to K. In other words, a direct-connect bus group is connected to only one memory group.

Through the P groups of arbiters, the P memory groups 120 may be connected to P direct-connect bus groups 130 among the L direct-connect bus groups 130 and be connected to the S slave interfaces 112, where a memory in a memory group 120 among the K memory groups 120 is connected, through an arbiter 141 in a group of arbiters 140 among the P groups of arbiters 140, to a direct-connect bus in a direct-connect bus group 130 among the P direct-connect bus groups 130 and is connected to a slave interface 112 among the S slave interfaces 112.

In this embodiment of the present invention, an arbiter may be configured to perform, according to weight values of the interleaved bus and a direct-connect bus, or according to priorities of the interleaved bus and a direct-connect bus, or based on a fair polling scheme, arbitration for an access operation that is among continuous-addresses access operations and is sent by the interleaved bus to a memory connected to the arbiter and for an access operation that is among discrete-addresses access operations and is sent by a direct-connect bus to a memory connected to the arbiter.

Specifically, when an arbiter receives access operations that are simultaneously sent by the interleaved bus and a direct-connect bus to a memory, the arbiter may perform, according to preset weight values or priorities of the direct-connect bus and the interleaved bus or based on a fair polling scheme, arbitration for the access operation that is sent by the interleaved bus and for the access operation that is sent by the direct-connect bus. A weight value may indicate the number of access operations that can be executed by a corresponding bus within a preset time; and a priority may indicate a sequence in which access operations can be executed by a corresponding bus within a specified time.

It should be understood that, the time when an arbiter receives the access operations that are simultaneously sent by the interleaved bus and the direct-connect bus to the memory may be not absolutely the same. For example, in the following case, the arbiter may also be considered to receive the access operations that are simultaneously sent by the interleaved bus and a direct-connect bus to the memory: after the arbiter receives the access operation sent by the direct-connect bus and before the arbiter processes the access operation sent by the direct-connect bus, the arbiter receives the access operation sent by the interleaved bus.

Figure 4:
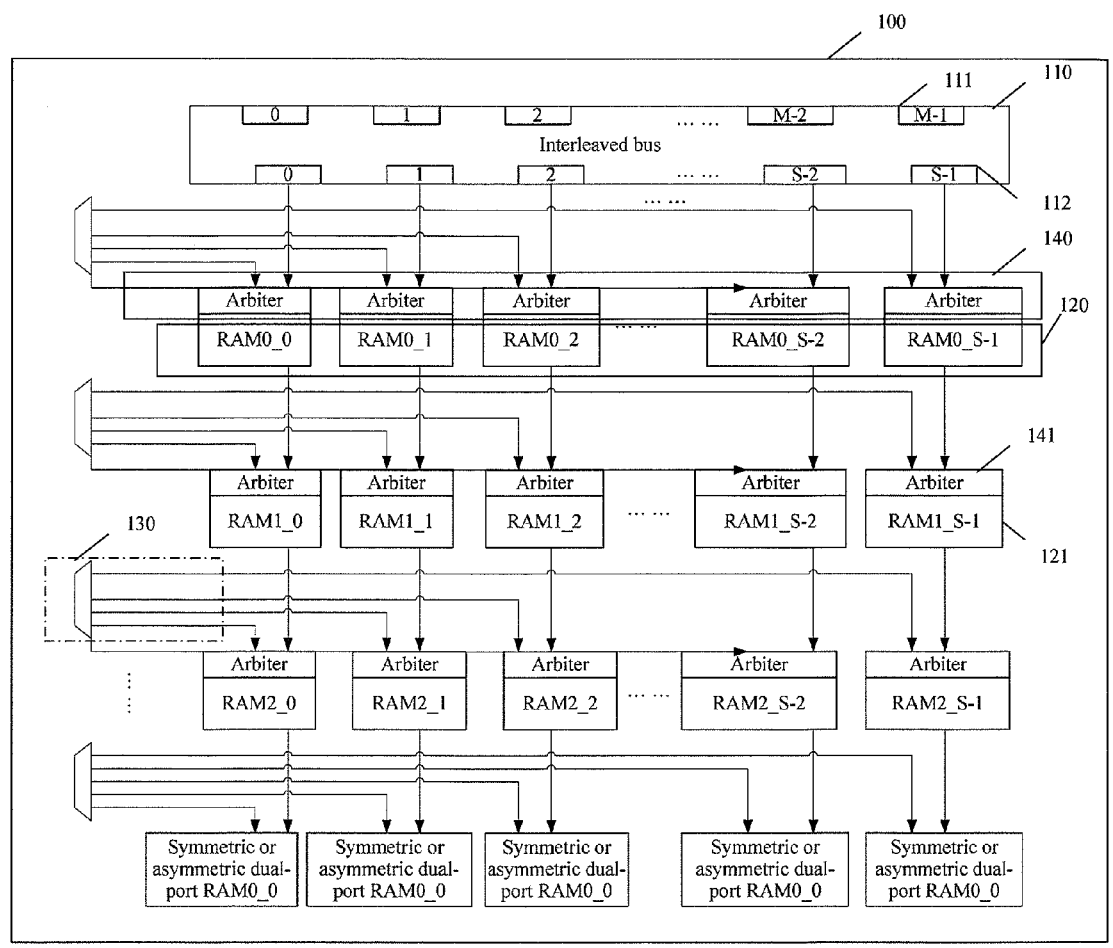
FIG. 4 shows a schematic diagram of a storage apparatus according to another embodiment of the present invention.

In this embodiment of the present invention, the N memory groups may include both single-port memories and symmetric dual-port or asymmetric dual-port memories. For example, as shown in FIG. 4, memories in the $N^{th}$ row of memory group are symmetric dual-port or asymmetric dual-port memories, while memories in the first row of memory group, the second row of memory group, and the third row of memory group are single-port memories. The single-port memories may be connected to a direct-connect bus and the interleaved bus through arbiters.

It should be understood that, although memories included in a memory group shown in FIG. 2, FIG. 3, and FIG. 4 are all single-port memories, or are all symmetric dual-port or asymmetric dual-port memories, any one memory group among the N memory groups in the embodiments of the present invention may also include both symmetric dual-port or asymmetric dual-port memories and single-port memories.

Therefore, the storage apparatus in this embodiment of the present invention includes an interleaved bus connected to N memory groups, and K direct-connect bus groups, each of which is connected to at least one memory group among the N memory groups. By using the storage apparatus, continuous-addresses access operations can be executed for one or more memory groups among the N memory groups through the interleaved bus, and discrete-addresses access operations can be executed for at least one memory group among the N memory groups through any one direct-connect bus group among the K direct-connect bus groups. In this way, efficiency of the continuous-addresses access operations can be ensured by taking advantage of a high access bandwidth that the interleaved bus provides for the continuous-addresses access operations, efficiency of the discrete-addresses access operations can be ensured by taking advantage of high access efficiency of a direct-connect bus, and impacts between the discrete-addresses access operations and the continuous-addresses access operations can be lowered as far as possible to provide as high bandwidth as possible for the system.

Figure 5:
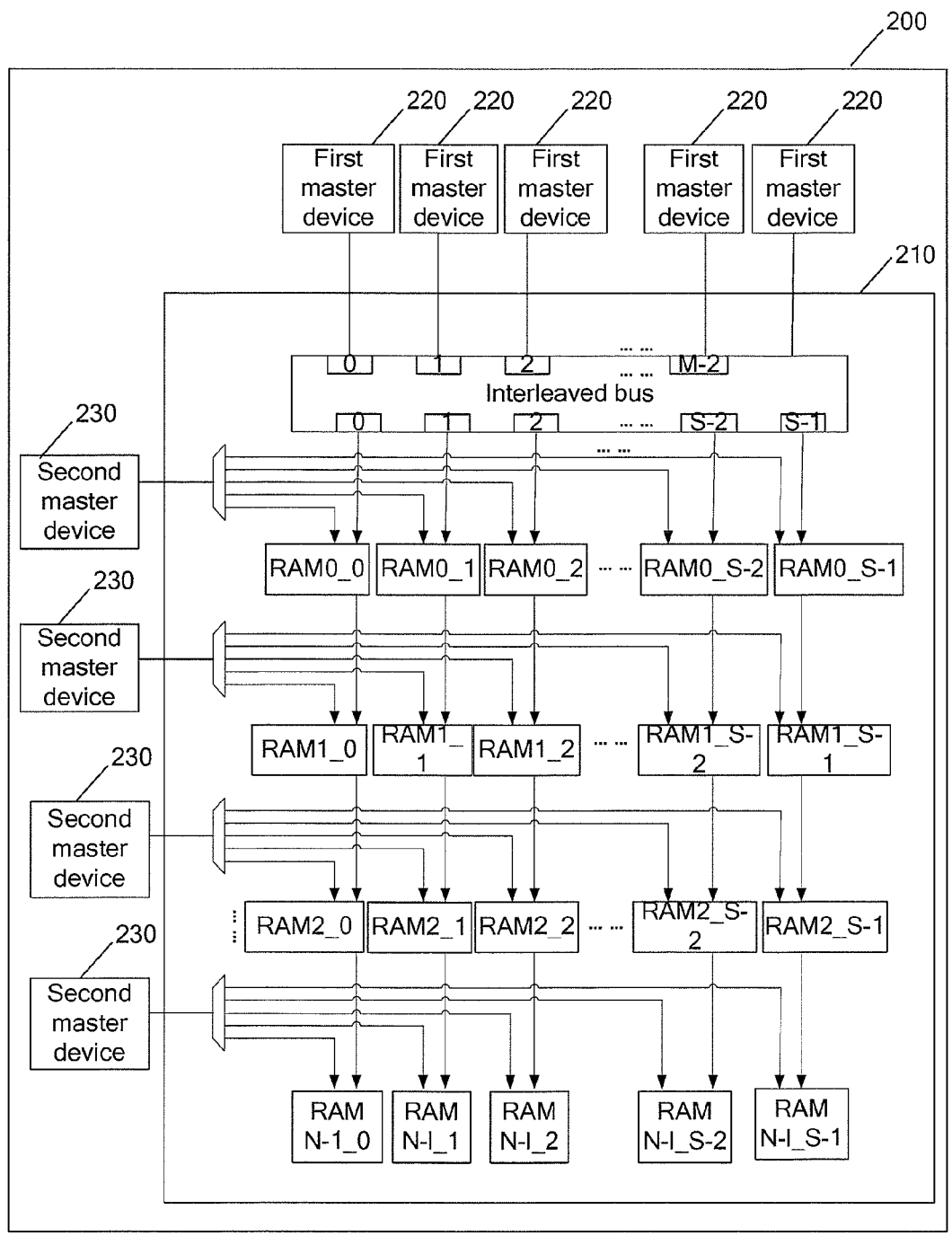
FIG. 5 shows a schematic diagram of a system for executing access operations according to an embodiment of the present invention.

FIG. 5 shows a schematic diagram of a system 200 for executing access operations according to an embodiment of the present invention. As shown in FIG. 5, the system 200 includes a storage apparatus 210, a first master device 220, and a second master device 230. The storage apparatus 210 may correspond to the storage apparatus 100 described above, the first master device 220 may correspond to the first master device described above, and the second master device 230 may correspond to the second master device described above. For simplicity, details are not described herein again.

Therefore, the storage apparatus included in the system for executing access operations in this embodiment of the present invention includes an interleaved bus connected to N memory groups, and K direct-connect bus groups connected to at least one memory group among the N memory groups. A first master device can execute continuous-addresses access operations for one or more memory groups among the N memory groups through the interleaved bus, and a second master device can execute discrete-addresses access operations for at least one memory group among the N memory groups through any one direct-connect bus group among the K direct-connect bus groups. In this way, efficiency of the continuous-addresses access operations can be ensured by taking advantage of a high access bandwidth that the interleaved bus provides for the continuous-addresses access operations, efficiency of the discrete-addresses access operations can be ensured by taking advantage of high access efficiency of a direct-connect bus, and impacts between the discrete-addresses access operations and the continuous-addresses access operations can be lowered as far as possible to provide as high bandwidth as possible for the system.

FIG. 6 shows a schematic flowchart of a method 300 for executing access operations according to an embodiment of the present invention. As shown in FIG. 6, the method 300 includes:

S310: An interleaved bus receives continuous-addresses access operations through any one master interface among M master interfaces, decodes the continuous-addresses access operations, and sends the continuous-addresses access operations to at least one memory group among N memory groups through S slave interfaces, where each memory group among the N memory groups includes S memories respectively connected to the S slave interfaces, addresses of the S memories in each memory group among the N memory groups are continuous, a difference between addresses of two storage units of any one memory among the S memories in each of the memory groups is an integral multiple of S, M is less than or equal to S, and M, S, and N are all integers.

S320: A first direct-connect bus group receives discrete-addresses access operations, and sends the discrete-addresses access operations to at least one memory group among the N memory groups, where the first direct-connect bus group is any one direct-connect bus group among the K direct-connect bus groups, each direct-connect bus group among the K direct-connect bus groups is connected to at least one memory group among the N memory groups, memory groups connected to different direct-connect bus groups are different, K is less than or equal to N, and K is an integer.

Optionally, the at least one memory group to which the first direct-connect bus group sends the discrete-addresses access operations and the at least one memory group to which the interleaved bus sends the continuous-addresses access operations both include a first memory group, and memories included in the first memory group are symmetric dual-port or asymmetric dual-port memories; the decoding the continuous-addresses access operations and sending the continuous-addresses access operations to at least one memory group among the N memory groups through S slave interfaces includes: decoding, by the interleaved bus, an access operation that is among the continuous-addresses access operations and corresponding to a first symmetric dual-port or asymmetric dual-port memory, and sending the access operation to the first symmetric dual-port or asymmetric dual-port memory through a first port of the first symmetric dual-port or asymmetric dual-port memory in the first memory group; and the sending the discrete-addresses access operations to at least one memory group corresponding to the first direct-connect bus group among the N memory groups includes: sending, by the first direct-connect bus group, an access operation that is among the discrete-addresses access operations and corresponding to the first symmetric dual-port or asymmetric dual-port memory to the first symmetric dual-port or asymmetric dual-port memory through a second port of the first symmetric dual-port or asymmetric dual-port memory.

Optionally, the at least one memory group to which the first direct-connect bus group sends the discrete-addresses access operations and the at least one memory group to which the interleaved bus sends the continuous-addresses access operations both include a first memory group, and memories included in the first memory group are single-port memories.

Correspondingly, the method 300 further includes: when the interleaved bus and the first direct-connect bus group send an access operation separately to a first single-port memory in the first memory group simultaneously, performing, by an arbiter, arbitration for the access operations that are separately sent by the interleaved bus and the first direct-connect bus group to the first single-port memory, to obtain an arbitration result; and sending, by the arbiter according to the arbitration result, the access operation that is sent by the interleaved bus to the first single-port memory and the access operation that is sent by the first direct-connect bus group to the first single-port memory to the first single-port memory.

Optionally, the performing, by an arbiter, arbitration for the access operations that are separately sent by the interleaved bus and the first direct-connect bus group to the first single-port memory includes: performing, by the arbiter according to weight values of the interleaved bus and the direct-connect bus, or according to priorities of the interleaved bus and the direct-connect bus, or based on a fair polling scheme, arbitration for the access operations that are separately sent by the interleaved bus and the first direct-connect bus group to the first single-port memory.

Optionally, the receiving, by an interleaved bus, continuous-addresses access operations through any one master interface among M master interfaces includes: receiving, by the interleaved bus through the any one master interface among the M master interfaces, the continuous-addresses access operations sent by a first master device; and the receiving, by a first direct-connect bus group, discrete-addresses access operations includes: receiving, by the first direct-connect bus group, the discrete-addresses access operations sent by a second master device.

Therefore, in this embodiment of the present invention, continuous-addresses access operations can be performed for one or more memory groups among N memory groups through an interleaved bus, and discrete-addresses access operations can be performed for one or more groups through a direct-connect bus group. In this way, efficiency of the continuous-addresses access operations can be ensured by taking advantage of a high access bandwidth that the interleaved bus provides for the continuous-addresses access operations, efficiency of the discrete-addresses access operations can be ensured by taking advantage of high access efficiency of a direct-connect bus, and impacts between the discrete-addresses access operations and the continuous-addresses access operations can be lowered as far as possible to provide as high bandwidth as possible for the system.

The present invention is described in detail with reference to the accompany drawing in combination with the exemplary embodiments, but the present invention is not limited to the foregoing. A person of ordinary skill may make various equivalent modifications or replacements to the embodiments of the present invention without departing from the spirit and essence of the present invention, and all these modifications or replacements should fall within the scope of the present invention.

What is claimed is:

1. A storage apparatus, comprising an interleaved bus, N memory groups, and K direct-connect bus groups, wherein K is less than or equal to N, and N and K are both integers; wherein the interleaved bus comprises M master interfaces and S slave interfaces, wherein each master interface among the M master interfaces is configured to receive continuous-addresses access operations, M is less than or equal to S, and M and S are both integers;

each memory group among the N memory groups comprises S memories respectively connected to the S slave interfaces, wherein addresses of the S memories in each of the memory groups are continuous, a difference between addresses of two storage units of any one memory among the S memories in each of the memory groups is an integral multiple of S, and the interleaved bus is configured to decode the continuous-addresses access operations, and send the continuous-addresses access operations to at least one memory group among the N memory groups; and each direct-connect bus group among the K direct-connect bus groups is connected to at least one memory group among the N memory groups, wherein one end of each direct-connect bus in each of the direct-connect bus groups is used to receive discrete-addresses access operations, the other end of each direct-connect bus is connected to a respective corresponding memory in the at least one memory group, memory groups connected to different direct-connect bus groups are different, and each direct-connect bus group among the K direct-connect bus groups is configured to send the discrete-addresses access operations to at least one memory group among the N memory groups.

2. The storage apparatus according to claim 1, wherein among the N memory groups, there are L memory groups connected to the each direct-connect bus group, wherein L is less than or equal to N, and is greater than or equal to K; and the L memory groups comprise at least one of the following types of memories: single-port memory, symmetric dual-port memory, and asymmetric dual-port memory, wherein one port of the asymmetric dual-port memory or symmetric dual-port memory is configured to connect to the interleaved bus, the other port of the asymmetric dual-port memory or symmetric dual-port memory is configured to connect to a direct-connect bus in the K direct-connect bus groups, and the single-port memory is configured to connect to an arbiter that is connected to the interleaved bus and a direct-connect bus in the K direct-connect bus groups.

3. The storage apparatus according to claim 2, wherein memories comprised in T memory groups among the L memory groups are symmetric dual-port memories or asymmetric dual-port memories, wherein T is an integer less than or equal to L, and L is equal to K; and any one memory in each memory group among the T memory groups is connected to a slave interface among the S slave interfaces through one port of the two ports, and is connected to a direct-connect bus in a direct-connect bus group among the K direct-connect bus groups through the other port of the two ports.

4. The storage apparatus according to claim 2, wherein memories comprised in P memory groups among the L memory groups are single-port memories, and the storage apparatus further comprises P groups of arbiters, wherein P is an integer less than or equal to L, and L is equal to K; and the P memory groups are connected, through the P groups of arbiters, to P direct-connect bus groups among the K direct-connect bus groups and to the S slave interfaces, wherein a single-port memory in a memory group among the P memory groups is connected, through an arbiter in a group of arbiters among the P groups of arbiters, to a direct-connect bus in a direct-connect bus group among the P direct-connect bus groups and to a slave interface among the S slave interfaces.

5. The storage apparatus according to claim 4, wherein an arbiter in the P groups of arbiters is configured to perform, according to weight values of the connected interleaved bus and direct-connect bus, or according to priorities of the interleaved bus and the direct-connect bus, or based on a fair polling scheme, arbitration for an access operation that is among the continuous-addresses access operations and is sent by the interleaved bus to a memory connected to the arbiter, and for an access operation that is among the discrete-addresses access operations and is sent by the direct-connect bus to a memory connected to the arbiter.

6. The storage apparatus according to claim 1, wherein each master interface among the M master interfaces is coupled to a first master device, wherein the first master device is configured to generate the continuous-addresses access operations; and one end of each direct-connect bus in each of the direct-connect bus groups is coupled to a second master device, wherein the second master device is configured to generate the discrete-addresses access operations.

7. A system for executing access operations, comprising a storage apparatus, a first master device, and a second master device, wherein the storage apparatus comprises an interleaved bus, N memory groups, and K direct-connect bus groups, wherein K is less than or equal to N, and N and K are both integers; the interleaved bus comprises M master interfaces and S slave interfaces, wherein each master interface among the M master interfaces is coupled to the first master device, M is less than or equal to S, and M and S are both integers; each memory group among the N memory groups comprises S memories respectively connected to the S slave interfaces, wherein addresses of the S memories in each of the memory groups are continuous, and a difference between addresses of two storage units of any one memory among the S memories in each of the memory groups is an integral multiple of S; and each direct-connect bus group among the K direct-connect bus groups is connected to at least one memory group among the N memory groups, wherein one end of each direct-connect bus in each of the direct-connect bus groups is coupled to the second master device, the other end of each direct-connect bus is connected to a respective corresponding memory in the at least one memory group, and memory groups connected to different direct-connect bus groups are different;

the first master device is configured to send continuous-addresses access operations to the interleaved bus through any one master interface among the M master interfaces of the interleaved bus, wherein the interleaved bus is configured to decode the continuous-addresses access operations, and send the continuous-addresses access operations to at least one memory group among the N memory groups; and the second master device is configured to send discrete-addresses access operations to any one direct-connect bus group among the K direct-connect bus groups, wherein the any one direct-connect bus group is configured to send the discrete-addresses access operations to at least one memory group among the N memory groups.

8. The system according to claim 7, wherein among the N memory groups, there are L memory groups connected to the each direct-connect bus group, wherein L is less than or equal to N, and is greater than or equal to K; and the L memory groups comprise at least one of the following types of memories: single-port memory, symmetric dual-port memory, and asymmetric dual-port memory, wherein one port of the asymmetric dual-port memory or symmetric dual-port memory is configured to connect to the interleaved bus, the other port of the asymmetric dual-port memory or symmetric dual-port memory is configured to connect to a direct-connect bus in the K direct-connect bus groups; and the single-port memory is configured to connect to an arbiter that is connected to the interleaved bus and a direct-connect bus in the K direct-connect bus groups.

9. A method for executing access operations, comprising:
receiving, by an interleaved bus, continuous-addresses access operations through any one master interface among M master interfaces, decoding the continuous-addresses access operations, and sending the continuous-addresses access operations to at least one memory group among N memory groups through S slave interfaces, wherein each memory group among the N memory groups comprises S memories respectively connected to the S slave interfaces, addresses of the S memories in each memory group among the N memory groups are continuous, a difference between addresses of two storage units of any one memory among the S memories in each of the memory groups is an integral multiple of S, M is less than or equal to S, and M, S, and N are all integers; and receiving, by a first direct-connect bus group, discrete-addresses access operations, and sending the discrete-addresses access operations to at least one memory group among the N memory groups, wherein the first direct-connect bus group is any one direct-connect bus group among the K direct-connect bus groups, each direct-connect bus group among the K direct-connect bus groups is connected to at least one memory group among the N memory groups, memory groups connected to different direct-connect bus groups are different, K is less than or equal to N, and K is an integer.

10. The method according to claim 9, wherein the at least one memory group to which the first direct-connect bus group sends the discrete-addresses access operations and the at least one memory group to which the interleaved bus sends the continuous-addresses access operations both comprise a first memory group, and memories comprised in the first memory group are symmetric dual-port or asymmetric dual-port memories;

the decoding the continuous addresses access operations, and sending the continuous addresses access operations to at least one memory group among N memory groups through S slave interfaces comprise: decoding, by the interleaved bus, an access operation that is among the continuous addresses access operations and corresponding to a first symmetric dual-port or asymmetric dual-port memory, and sending the access operation to the first symmetric dual-port or asymmetric dual-port memory through a first port of the first symmetric dual-port or asymmetric dual-port memory in the first memory group; and and the sending the discrete-addresses access operations to at least one memory group corresponding to the first direct-connect bus group among the N memory groups comprises: sending, by the first direct-connect bus group, an access operation that is among the discrete-addresses access operations and corresponding to the first symmetric dual-port or asymmetric dual-port memory to the first symmetric dual-port or asymmetric dual-port memory through a second port of the first symmetric dual-port or asymmetric dual-port memory.

11. The method according to claim 9, wherein the at least one memory group to which the first direct-connect bus group sends the discrete-addresses access operations and the at least one memory group to which the interleaved bus sends the continuous-addresses access operations both comprise a first memory group, and memories comprised in the first memory group are single-port memories; and the method further comprises:

when the interleaved bus and the first direct-connect bus group send an access operation to a first single-port memory in the first memory group simultaneously, performing, by an arbiter, arbitration for the access operations that are sent by the interleaved bus and the first direct-connect bus group separately to the first single-port memory, to acquire an arbitration result; and sending, by the arbiter according to the arbitration result, the access operation sent by the interleaved bus to the first single-port memory and the access operation sent by the first direct-connect bus group to the first single-port memory to the first single-port memory.

12. The method according to claim 11, wherein the performing, by an arbiter, arbitration for the access operations that are sent by the interleaved bus and the first direct-connect bus group separately to the first single-port memory comprises:

performing, by the arbiter according to weight values of the interleaved bus and the direct-connect bus, or according to priorities of the interleaved bus and the direct-connect bus, or based on a fair polling scheme, arbitration for the access operations that are sent by the interleaved bus and the first direct-connect bus group separately to the first single-port memory.

13. The method according to claim 9, wherein the receiving, by an interleaved bus, continuous-addresses access operations through any one master interface among M master interfaces comprises: receiving, by the interleaved bus through the any one master interface among the M master interfaces, the continuous-addresses access operations sent by a first master device; and the receiving, by a first direct-connect bus group, discrete-addresses access operations comprises: receiving, by the first direct-connect bus group, the discrete-addresses access operations sent by a second master device.

* * * * *